United States Patent
Chang et al.

[11] Patent Number: 6,072,872
[45] Date of Patent: Jun. 6, 2000

[54] DETERMINATION OF SCRAMBLING MODE OF A TELEVISION SIGNAL

[75] Inventors: Kevin T. Chang, Neshanic Station, N.J.; Alfred W. Stufflet, Norristown, Pa.

[73] Assignee: General Instrument Corporation, Horsham, Pa.

[21] Appl. No.: 09/014,088

[22] Filed: Jan. 27, 1998

[51] Int. Cl.[7] ................................................. H04N 7/167
[52] U.S. Cl. ........................ 380/216; 380/226; 348/441
[58] Field of Search ..................................... 380/210, 216, 380/218, 221, 223, 225, 236, 238, 212, 226, 242; 348/441, 558

[56] References Cited

U.S. PATENT DOCUMENTS

| | | | |
|---|---|---|---|
| 4,598,318 | 7/1986 | Robbins | 358/129 |
| 4,790,011 | 12/1988 | Bellavia, Jr. | 380/15 |
| 5,138,659 | 8/1992 | Kelkar et al. | 380/20 |

OTHER PUBLICATIONS

Coffell, "Tri–Mode Cable–TV Scrambling," Radio Electronics, vol. 58, No. 2, pp. 43–47 and 120, Feb. 1997.

*Primary Examiner*—Gail O. Hayes
*Assistant Examiner*—Trevor Quick Coddington
*Attorney, Agent, or Firm*—Barry R. Lipsitz; Ralph F. Hoppin

[57] ABSTRACT

A signal such as an analog scrambled television signal in a cable television network has first scrambling mode data which is compatible with a first decoder population, but not a second decoder population. The scrambled television signal is processed to determine the scrambling mode without recovering the first scrambling mode data. Second scrambling mode data which is compatible with the second decoder population is then provided in the scrambled television signal, for example, in the vertical blanking interval or on an audio subcarrier. During processing to determine the scrambling mode, the television signal is delayed, e.g., by digitizing it and temporarily storing it in memory. The delay compensates for the time required to determine the scrambling mode. The television signal is recovered in the analog domain prior to inserting the second scrambling mode data. The system is compatible with various scrambling modes, including sync suppression and inversion of the active video as well as with dynamic scrambling mode changes.

37 Claims, 5 Drawing Sheets

DETERMINATION OF SCRAMBLING MODE OF A TELEVISION SIGNAL

BACKGROUND OF THE INVENTION

The present invention relates to a method and apparatus for determining the scrambling mode of a data signal such as a television signal in a cable television network, and providing corresponding scrambling mode data in a specific decoder-compatible format. The invention allows decoders to be compatible with an encoder of a different manufacturer or vendor.

Various techniques are known for scrambling television signals. In particular, an encoder can scramble a signal using modification (e.g., suppression or scrambling) of synchronization information and/or inversion of portions of the active video. Moreover, the scrambling mode can vary with time. For example, the level of suppression can vary between two or more levels every few seconds. The particular type of scrambling is known as the scrambling mode. Additionally, data which indicates the scrambling mode can be communicated with the scrambled signal itself to a decoder population for use by the decoders in descrambling the signal. For example, the scrambling mode data may be provided in the vertical blanking interval (VBI) of the television signal or in an audio subcarrier.

Accordingly, in order for a decoder to be able to recover and identify the scrambling mode data, it must have a priori knowledge of the scrambling mode data format. When the encoder and decoder are produced by the same manufacturer or vendor, or otherwise designed according to a common standard, there is no difficulty.

However, in practice, encoders and decoders which are currently available are produced by different manufacturers and may use a variety of different scrambling modes as well as scrambling mode data formats. Accordingly, cable television network operators and others are constrained to select specific encoder and decoder equipment which is compatible. This has various drawbacks for the network operators as well as the subscribers. For example, the network operators may not be able to employ the latest decoder features without updating the headend encoder, or to purchase new equipment at the most competitive price. Moreover, the network operator may be precluded from gradually updating the decoders in a network with a new type of decoder, if the new decoders are not compatible with the existing scrambling mode data format.

Accordingly, it would be desirable to have a system for detecting the scrambling mode of an analog television signal, and providing corresponding scrambling mode data in a format which is compatible with a specific decoder population.

The system should allow two or more different formats of scrambling mode data to be carried with a scrambled television signal to provide compatibility with two or more corresponding decoder populations.

The system should be able to detect modification (e.g., suppression or scrambling) of a synchronization pulse of a television signal as well as an inversion of an active video portion.

The system should further be able to detect dynamic changes in the scrambling mode of a television signal.

The system should not degrade the image quality of the television signal.

The present invention provides a system having the above and other advantages.

SUMMARY OF THE INVENTION

The present invention relates to a method and apparatus for determining the scrambling mode of a data signal such as a television signal in a cable television network, and providing corresponding scrambling mode data in a specific decoder-compatible format.

A method for processing a first scrambled analog television signal comprises the step of digitizing the first scrambled analog television signal to provide a digitized scrambled television signal. The digitized scrambled television signal is then stored in a memory, such as a random access memory (RAM). The first scrambled analog television signal is processed to detect a scrambling mode thereof, and scrambling mode data which is indicative of the detected scrambling mode is provided. Importantly, the scrambling mode data is compatible with the decoder.

The digitized scrambled television signal is retrieved from the memory and recovered using a D/A converter to recover a second scrambled analog television signal which is essentially the same as the first scrambled analog television signal. Appropriate accuracy is used in the digitizing and recovering steps to avoid any noticeable reduction of the image quality.

The scrambling mode data is then inserted into the second scrambled analog television signal, for example, in a vertical blanking interval or audio subcarrier.

The second scrambled analog television signal is transmitted with the scrambling mode data to the decoder via a communication network, for example, a cable television network which has a hub and spoke configuration.

The first scrambled analog television signal is obtained by scrambling a clear analog television signal. The scrambling mode may be detected in a variety of ways involving sampling of the second scrambled signal and comparison with a reference value. The reference value may be pre-stored in a memory, for example, or obtained from the clear television signal. Additionally, timing information may be obtained from the first clear analog television signal to coordinate the sampling of the second scrambled signal and, if required, the clear signal itself.

For example, the non-suppressed horizontal sync pulses of the clear signal may be used as a timing reference. Any significant delay due to the digitizing and recovering of the scrambled signal should also be accounted for in determining the sampling time.

The particular portion of the first scrambled signal which is sampled depends on the scrambling mode which is being tested. For example, if suppression or other modification of the horizontal sync pulse is being tested, the sync-suppressed region of the first scrambled television signal is sampled. Similarly, if inversion of the active video of the scrambled signal is being tested, the active video region of the first scrambled analog television signal should be sampled.

When the sampled value of the first scrambled video signal is compared to a sampled value from the clear signal, the samples are taken at corresponding portions of the respective video signals.

Preferably, the scrambling mode of the scrambled analog television signal is determined for every frame or field since the scrambling mode may also change on a frame-by-frame or field-by-field basis. Accordingly, the scrambling mode data should also be inserted into every frame or field. Moreover, with some scrambling schemes, it is possible for the transition between scrambling modes to occur at an intermediate position (e.g., line number) within a given field such that two scrambling modes may be present in the field. The determination of the scrambling mode should therefore be calibrated to the transition point.

The first scrambled analog television signal may have associated (first) scrambling mode data which is not useable (e.g., incompatible) with the decoder. This data may remain with the scrambled signal, but is ignored by the decoders which are compatible with the newly-inserted (second scrambling mode data. However, in a given network, there may be decoders which are compatible with different types of scrambling mode data. For example, decoders which are compatible with only the original, first scrambling mode data will use that data and ignore the second scrambling mode data.

The invention is compatible with various scrambling modes, including sync suppression or other modification, video inversion, and combinations thereof, as well as dynamic scrambling mode changes.

An apparatus is presented for processing a first scrambled analog television signal which has associated first scrambling mode data which is incompatible with a decoder. The first scrambled analog television signal is obtained by scrambling a first clear analog television signal. The apparatus comprises means for delaying the first scrambled analog television signal for a delay period; means for processing the first scrambled analog television signal to detect a scrambling mode thereof during the delay period; means for providing second scrambling mode data which is indicative of the detected scrambling mode, and which is compatible with the decoder; means for retrieving the delayed first scrambled television signal and recovering a second scrambled analog television signal therefrom which corresponds to the first scrambled analog television signal; and means for inserting the second scrambling mode data into the second scrambled analog television signal.

The apparatus may further comprise means for transmitting the second scrambled analog television signal with the second scrambling mode data to the decoder via a communication network, such as a cable television network. The means for delaying may further comprise means for digitizing the first scrambled analog television signal; and means for temporarily storing the digitized scrambled television signal.

The scrambling mode may be detected using timing information obtained from the first clear analog television signal.

The means for processing may comprise means for sampling at least a first value of the first scrambled analog television signal; and means for comparing the first value to a pre-stored value.

The first value may be sampled from a sync-suppressed region of the first scrambled analog television signal. In this case, the apparatus may further comprise means for sampling at least a first value of the first scrambled analog television signal; means for sampling at least a first value of the first clear analog television signal; and means for comparing the first value of the first scrambled analog television signal to the first value of the first clear analog television signal.

Furthermore, the first value of the first scrambled analog television signal may be sampled from a sync-suppressed region thereof; and the first value of the clear analog television signal may be sampled from a synchronization pulse region thereof which corresponds to the sync-suppressed region.

The first value of the first scrambled analog television signal may be sampled from an inverted active video region thereof; and the first value of the first clear analog television signal may be sampled from an active video region thereof which corresponds to the inverted active video region.

Preferably, the scrambling mode of the first scrambled analog television signal is determined on a frame-by-frame basis for frame (progressive) mode video, or on a field-by-field basis for field (interlaced) mode video. The scrambling mode data in thus also inserted into the television signal at the same rate at which the scrambling mode is determined.

The apparatus may further comprise means for descrambling the first scrambled analog television signal to obtained a second clear analog television signal corresponding to the first scrambled analog television signal; and means for using the second clear analog television signal to detect the scrambling mode. In this case, the scrambling mode is detected using timing information obtained from the second clear analog television signal.

The apparatus may further comprise means for sampling at least a first value of the first scrambled analog television signal; means for sampling at least a first value of the second clear analog television signal; and means for comparing the first value of the first scrambled analog television signal to the first value of the second clear analog television signal.

A decoder in accordance with the present invention is also presented. The decoder processes a scrambled analog television signal which has associated first and second scrambling mode data, wherein the decoder is incompatible with the first scrambling mode data but is compatible with the second scrambling mode data. The decoder comprises a scrambling mode extractor for extracting the second scrambling mode data from the scrambled analog television signal; a control which is responsive to the scrambling mode extractor for accessing a memory to obtain a pre-stored descrambling command which corresponds to the second scrambling mode data; and means for providing the descrambling command to a descrambler to descramble the scrambled analog television signal.

DETAILED DESCRIPTION OF THE INVENTION

The present invention relates to a method and apparatus for determining the scrambling mode of a data signal such as a television signal in a cable television network, and providing corresponding scrambling mode data in a specific decoder-compatible format.

A composite video signal such as one which conforms to the NTSC standard includes picture luminance and chrominance information as well as timing information for the synchronization of scanning and color processing circuits at a receiver. At the end of each line scan at the receiver, a horizontal synchronizing pulse (HSYNC) commands the scanning circuit to return the scanning beam to the left of the screen to begin scanning a new line. Similarly, at the completion of each field or frame, a vertical synchronizing pulse (VSYNC) commands the scanning circuit to return to the top of the screen to begin scanning the next field or frame. The return period is known as the vertical blanking interval (VBI).

Accordingly, the television signal may be scrambled by altering the normal position and/or amplitude of the synchronization pulses. Such techniques for scrambling the video portions of television signals are well known. For example, U.S. Pat. No. 3,813,482 to Blonder discloses a system for transmitting television signals where the video is scrambled by suppressing the vertical or horizontal synchronization pulses to produce a shifting or rolling scrambled picture. U.S. Pat. No. 4,542,407 to Cooper et al. discloses an apparatus for scrambling and descrambling television programs in which the horizontal synchronization information is suppressed at a cable television (CATV) headend, and then regenerated by a subscriber's cable television converter. U.S. Pat. No. 4,095,258 to Sperber, U.S. Pat. No. 4,163,252 to Mistry et al., and U.S. Pat. No. 4,571,615 to Robbins et al. describe schemes for decoding scrambled television signals.

In particular, by suppressing the horizontal synchronization pulses below the average value of the active video, a television receiver attempts unsuccessfully to lock horizontally on to random peaks of the active video rather than the HSYNC pulses. Additionally, the loss of effective horizontal synchronization prevents the receiver from properly utilizing the color burst signal which is associated with the HSYNC pulse, so that color reproduction is also faulty. Moreover, in addition to suppression, other modification or scrambling of the horizontal synchronization pulses may be used.

In order for a receiver to restore (i.e., descramble) the scrambled video signal, the suppressed synchronization pulses must be restored. This may be accomplished by amplitude modulating timing pulses on the FM audio carrier of the television signal. The pulses are then detected in the audio portion of the receiver and used to generate the timing signals necessary to descramble the received video signal. Alternatively, a portion of the sync timing pulses is transmitted without suppression, for example, during the vertical blanking interval. The receiver is phase-locked to the unsuppressed signals to create the required timing and synchronization information for descrambling the video portion of the signal.

Further scrambling of a television signal may be achieved by inverting a portion of the active video such as described in U.S. Pat. No. 4,598,318 to Robbins.

Other scrambling schemes alter the position of the color burst to prevent a receiver from locking onto the color burst to gain timing information. For example, U.S. Pat. No. 5,146,496 to Westerfer et al., entitled "Method and Apparatus for Enhancing the Security of a Scrambled Television Signal" discloses altering the position of the color burst from line to line, while U.S. Pat. No. 5,651,065 to Stufflet et al., entitled "Insertion of Supplemental Burst into Video Signals to Thwart Piracy and/or Carry Data" discloses the use of supplemental color bursts.

The present invention is useful with all of these different scrambling schemes, and others already known or which may be developed in the future.

Figure 1:
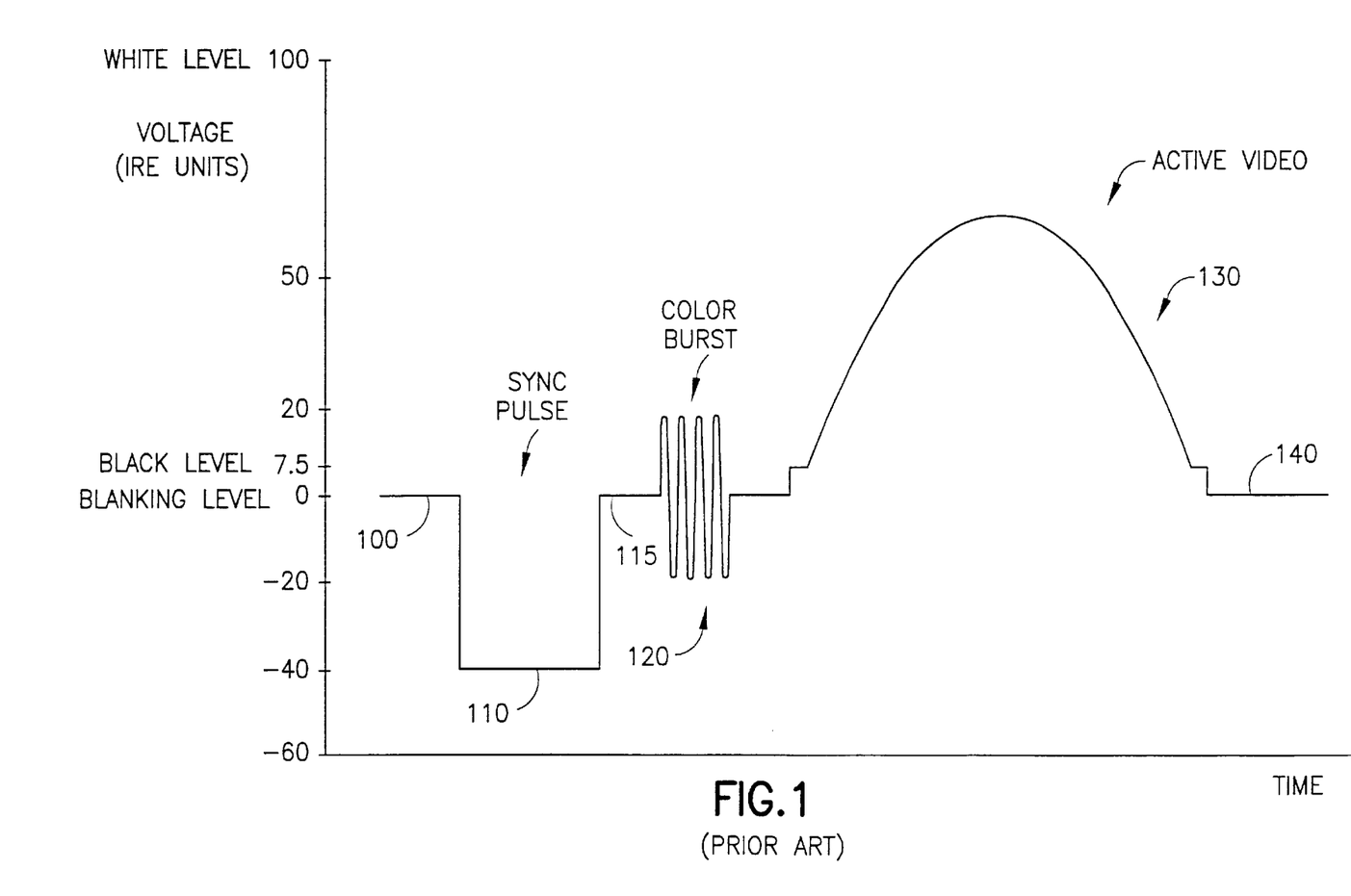
FIG. 1 illustrates an amplitude versus time sketch of a conventional television signal.

FIG. 1 illustrates an amplitude versus time sketch of a conventional television signal. The trace shown is a baseband signal since it has not yet been modulated on an RF carrier. The amplitude of the voltage of the signal is expressed in IRE units as established by the Institute of Radio Engineers in the example shown. A blanking level (i.e., front porch) 100, corresponding to zero IRE units precedes a sync pulse 110, which is at a synchronization level of −40 IRE. The sync pulse shown is a horizontal sync pulse, although the invention can be used alternatively, or in addition, with a vertical sync pulse, or other predetermined level. Moreover, the sync level shown denotes an unscrambled signal. With a scrambled signal, the sync pulse is attenuated from the level shown by −6 dB or −10 dB, for example.

Another blanking level signal (i.e., back porch) 115 follows the sync pulse 110. Next, a color burst 120, which is 8–10 cycles at 3.58 MHz, is provided. Subsequently, an active video region 130 is provided. The active video region is shown having a smooth curved shape for simplicity. Another blanking level 140 follows the active video 130.

Suppression of the sync pulse 110 can be achieved by passing the amplitude-modulated television signal through a 6 dB or 10 dB attenuator during a sync suppression time which extends for a period of about 12 μsec., namely from 1.8 μsec. before the sync pulse 110 to about 5.7 μsec. after the sync pulse 110.

The power level of a transmitted scrambled signal can be increased, e.g., by 3 dB when the sync tip is suppressed, to improve the overall signal-to-noise ratio.

Figure 2:
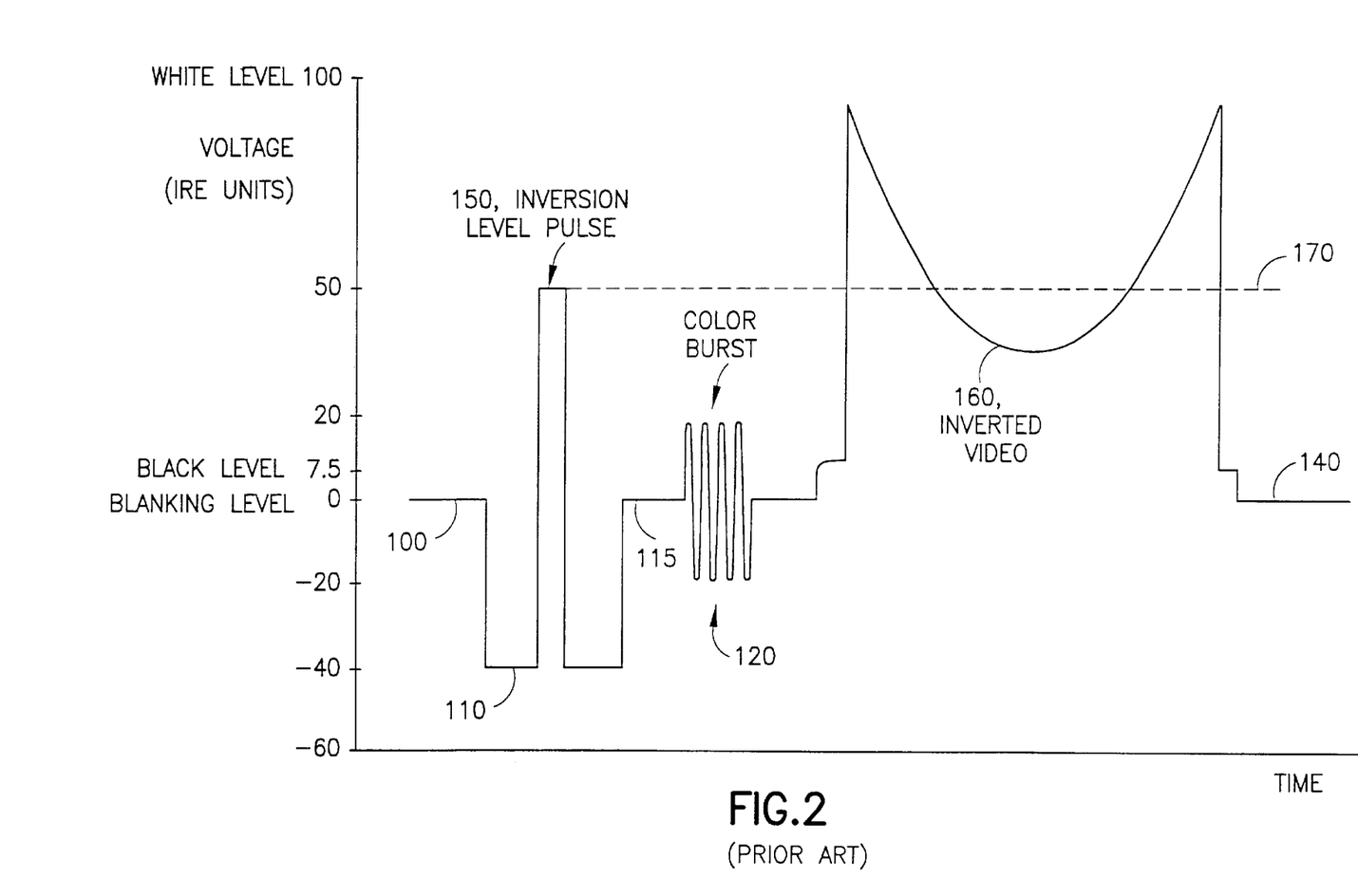
FIG. 2 illustrates an amplitude versus time sketch of a television signal with an inverted video portion and an inversion level pulse.

FIG. 2 illustrates an amplitude versus time sketch of a television signal with an inverted video portion. With this scrambling technique, as disclosed in the aforementioned U.S. Pat. No. 4,598,318 to Robbins, an inversion level pulse 150 is provided in the sync pulse 110 to designate an amplitude level about which the active video is inverted. In the example shown, the inversion level pulse has an amplitude of 50 IRE, so the active video is inverted about an amplitude, shown by a line 170, at 50 IRE. The inverted video 160 is essentially a mirror image of the non-inverted active video 130 of FIG. 1.

All or only randomly selected lines of a video field or frame may be inverted. However, the inversion level pulse is generally provided in each line, even for non-inverted lines, to avoid alerting a pirate to the presence of an inversion. An inversion level pulse at 50 IRE is a convenient level to use since it is half way between the white level at 100 IRE and the blanking level at 0 IRE. 50 IRE may be considered to be a 50% video level since the video extends from 0–100 IRE.

Other inversion levels may be used, such as 30 IRE, which is the midpoint of the range from −40 to 100 IRE. The reference pulse may be provided in addition to the inversion level pulse when the two differ, but it is convenient to use the inversion pulse as a reference pulse if possible. Any signal which has active video below the blanking level is assumed to be inverted, since somewhere in every field there would be some gray (white) video normally.

Additionally, inversion may be coherent or out of phase. For out of phase inversion, a temporal delay is introduced between the inverted signal and the non-inverted signal.

The reference pulse 150 may be inserted into the sync pulse 110 or other predetermined location in the video signal. For example, lines 22 and/or 23 of the vertical blanking interval may be used. Use of these lines makes it difficult to observe when inversion on line 24 takes place. Any modulator can be modified to provide the reference pulse.

Figure 3:
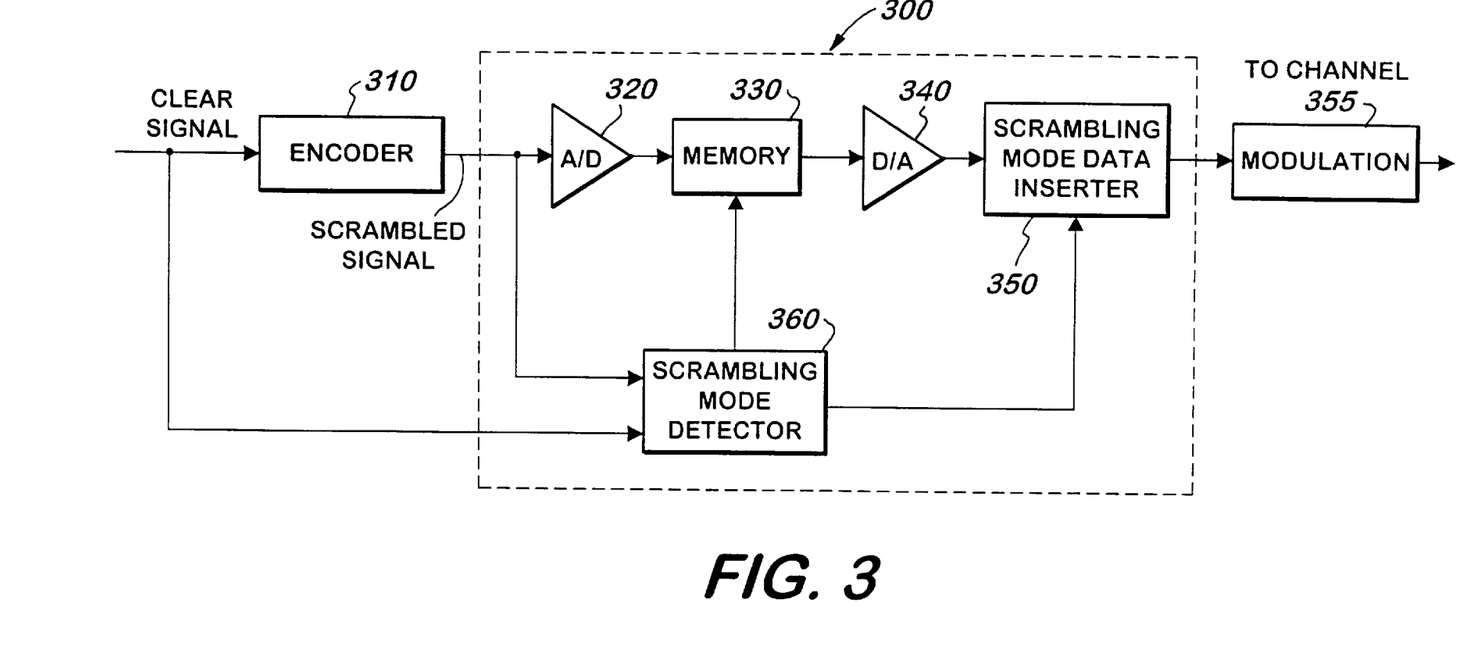
FIG. 3 illustrates a scrambling mode detection circuit in accordance with the present invention.

FIG. 3 illustrates a scrambling mode detection and insertion circuit in accordance with the present invention. A conventional encoder 310 receives a clear (non-scrambled) television or other signal, and outputs a corresponding scrambled signal. The encoder 310 may implement the various scrambling modes discussed above. Additionally, the encoder 310 inserts (first) scrambling mode data into the scrambled signal according to the scrambling mode data format of the encoder 310. The scrambled signal output from the encoder is preferably at baseband. Modulation is performed at the modulator 355 using conventional techniques.

The scrambling mode detection and insertion circuit 300 includes an analog-to-digital (A/D) converter 320, a memory 330, a digital-to-analog (D/A) converter 340, a scrambling mode data inserter 350, and a scrambling mode detector 360.

Note that the scrambling mode detection and insertion circuit 300 and the encoder 310 can be at the same location, such as a cable television headend. For example, this can allow fielding of one manufacturer's decoders when another manufacturer's encoder is used at the headed.

Alternatively, the scrambling mode detection and insertion circuit 300 and the encoder 310 can be at different locations. For example, the encoder 310 may be located at a cable headend for transmitting a scrambled signal to a decoder population. The scrambling mode detection and insertion circuit 300 may be located in the field at some distance from the headend with a descrambler. The descrambler can descramble the signal to provide a clear signal as indicated in FIG. 3.

The scrambled signal output from the encoder 310 is digitized at the A/D converter 320 and stored in the memory 330. The memory 330 may be a RAM or other known type of storage device. The purpose of the memory 330 is to delay the video signal by enough time to enable the accurate detection of the scrambling mode. Instead of digitizing the analog signal, it is possible to use any known analog delay technique.

In order to detect the scrambling mode, the scrambled signal is also provided to the scrambling mode detector 360. In some cases, it may be possible to determine the scrambling mode from the scrambled signal alone. However, the clear signal may also be provided to the scrambling mode detector 360 for use in detecting the scrambling mode.

Once the scrambling mode is detected, the scrambling mode detector 360 provides a control signal to the memory 330 to instruct the memory to begin to output the stored signal to the D/A converter 340 and the scrambling mode data inserter 350. The scrambling mode detector 360 also identifies the detected scrambling mode to the scrambling mode data inserter 350. With this identification, the data inserter 350 can provide (second) scrambling mode data in a specific decoder-compatible format for insertion into the scrambled signal. The resultant signal is then output to the modulator 355, and then to a channel. For example, the scrambled signal may be multiplexed with other scrambled and non-scrambled signals and transmitted to a decoder population via a cable television network. In this case, the encoder 310 and circuit 300 can be provided at a cable television headend.

The scrambled signal which is output from the inserter 350 therefore has both first and second types of scrambling mode data which have different formats. Generally, the inserter 350 should provide the second type of scrambling mode data in the scrambled signal so that it does not interfere with the first type. In this manner, the first scrambling mode data can be recovered by decoders which are compatible with the first scrambling mode data format, while the second scrambling mode data can be recovered by decoders which are compatible with the second scrambling mode data format.

It will be appreciated that additional scrambling mode data can be inserted into the scrambled signal so that it is possible to provide three or more formats of scrambling mode data for three or more decoder population types.

Moreover, while the circuit 300 shown provides near real-time insertion and transmission of the second scrambling mode data, it is possible to store the scrambled signal after the second scrambling mode data has been inserted for transmission at a later time.

Figure 4:
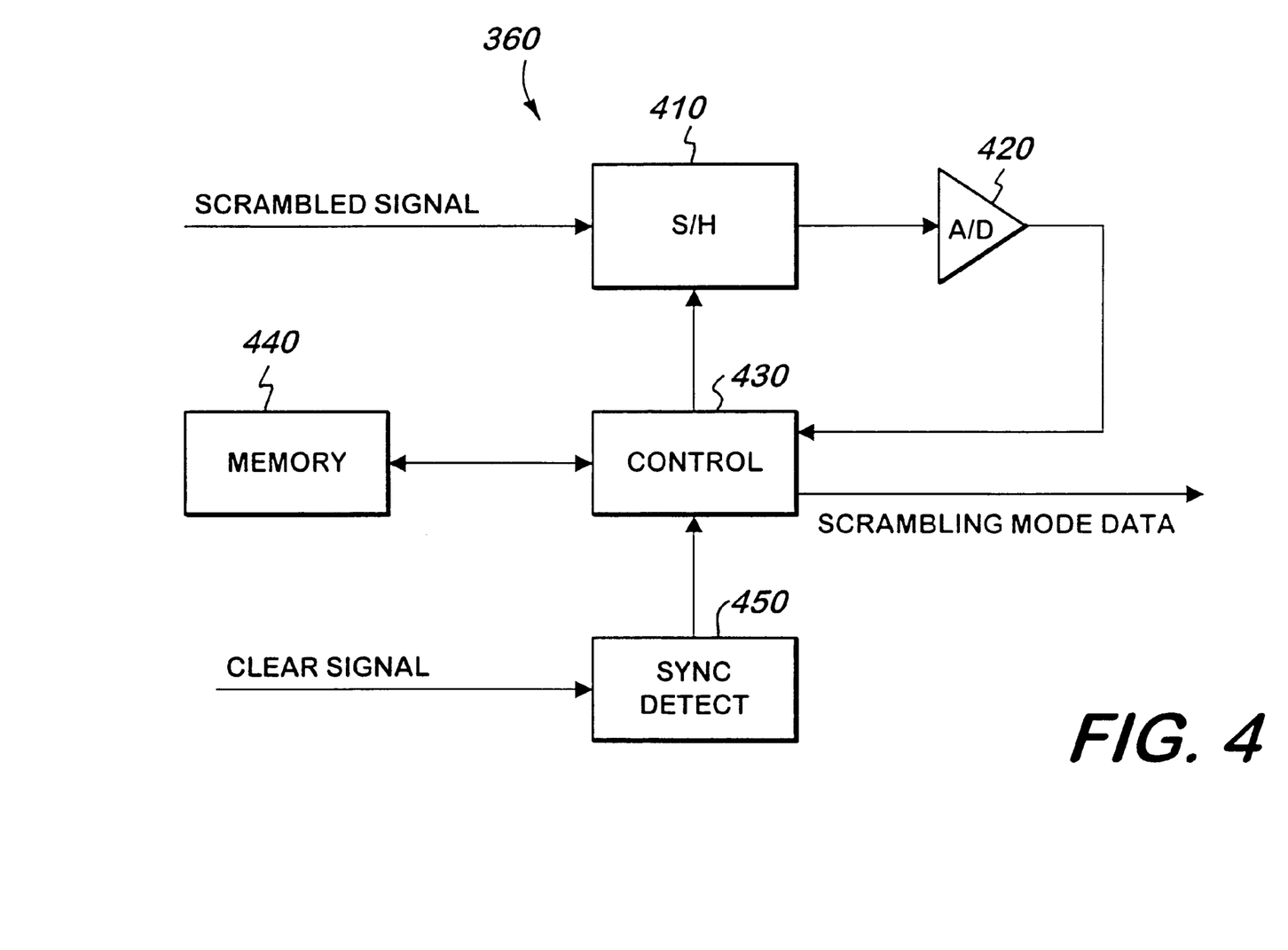
FIG. 4 illustrates an example embodiment of the scrambling mode detector of FIG. 3 in accordance with the present invention.

FIG. 4 illustrates an example embodiment the scrambling mode detector 360 of FIG. 3 in greater detail. It will be appreciated that other implementations of a scrambling mode detector are possible. Specific techniques for detecting the scrambling mode at the scrambling mode detector 360 will now be discussed. In the embodiment shown, a sample-and-hold (S/H) circuit 410, A/D converter 420, control 430, memory 440 and sync detect circuit 450 are used. The clear signal (which may be recovered locally) is input to the sync detect circuit 450, where synchronization information is obtained. For example, the sync detect circuit may detect the horizontal synchronization pulses which are present in the clear signal using a phase-locked loop.

The synchronization pulses are provided at a regular frequency such that the sync detect function 450 can provide a synchronization signal, e.g., a train of pulses, to the control 430. The control 430, which may be a microprocessor controller, sends a control signal to the S/H circuit 410 to command the circuit 410 to sample the scrambled signal at a specific time which is synchronized with the clear signal. For example, the S/H circuit 410 may sample the scrambled signal at a designated time which corresponds to the portion of the scrambled television signal in which a suppressed or otherwise modified horizontal synchronization pulse is expected.

This designated sampling time may correspond to the time in which the horizontal sync pulse of the clear signal is received, or there may be a delay built in to account for processing time of the encoder 310, if necessary.

The sampled analog signal value from the scrambled signal is provided to the A/D converter 420 and then to the control 430. The control 430 also communicates with a memory 440 which stores a comparison value which is compared to the sampled value. The comparison value may be preprogrammed (e.g., pre-stored) in the memory or obtained from the clear signal. If the comparison value is obtained from the clear signal, an additional S/H circuit and A/D converter can be provided to sample the clear signal.

It is also possible to use comparison values which are both pre-stored and obtained by sampling the clear signal.

For example, the comparison value may be a voltage amplitude which corresponds to the non-suppressed level of the horizontal sync pulse, e.g., −40 IRE, while the sample value has a voltage amplitude of a suppressed horizontal sync pulse, e.g., 6 dB or 10 dB less than the non-suppressed level. The control can thereby determine that the scrambled signal has a suppressed horizontal sync pulse, as well as the level of suppression.

The presence of an inversion in the active video can be determined by directly sampling the active video of the scrambled signal and the clear signal, and comparing the values to each other. Again, using the horizontal sync pulse of the clear signal as a timing reference, the active video of the scrambled and clear signals can be sampled at one or more points. If the sampled values at the same point differ significantly, this indicates an inversion. It is also possible to sample the inversion pulse or use a priori knowledge of the inversion pulse amplitude to determine if there is an inversion. For example, if the sampled level from the clear signal is at 80 IRE, and the sampled level from the scrambled signal is at 20 IRE, and it is further known that the inversion level is 50 IRE, the controller will determine that the clear signal and scrambled signal are equally offset from the inversion level (e.g., by 30 IRE), thereby indicating the active video is inverted.

More than one comparison point in the active video may be used for a reliable detection of an inversion.

As mentioned, both sync suppression and video inversion may be used. Additionally, the sync suppression level may vary between two or more values every few seconds. Accordingly, the scrambling mode should preferably be detected on a frame-by-frame basis for progressive video, or on a field-by-field basis for interlaced video, absent a priori knowledge that would exclude specific scrambling modes. Frequent scrambling mode detection and mode data insertion allows a decoder to descramble a newly tuned channel quickly, thereby avoiding the unnecessary display of a scrambled signal on a television.

Furthermore, with some scrambling schemes, it is possible for the transition between scrambling modes to occur at an intermediate position (e.g., line number) within a given field such that two scrambling modes may be present in one field or frame. The determination of the scrambling mode should therefore be calibrated to the transition point.

Although the specific scrambling mode can be detected without a priori knowledge of the scrambling mode, detection can be facilitated when it is known that a specific number and types of scrambling formats may be used. For example, the scrambling mode detector may be designed to work in conjunction with the encoders of a limited number of manufacturers or vendors, e.g., a limited number of scrambling formats. Moreover, different manufacturers may use some common scrambling modes. For example, some sort of sync suppression is typically used with most scrambling formats.

Table 1 below indicates a possible scenario. Three different manufacturers are represented by M1, M2 and M3. Five different scrambling techniques are indicated by S1–S5. A given manufacturer may use one or more of the scrambling techniques.

TABLE 1

| Scrambling format: | M1 | M2 | M3 |
|---|---|---|---|
| (S1) sync suppression (6 dB) | X | | |
| (S2) sync suppression (10 dB) | | | |
| (S3) alternating sync suppression | | X | X |
| (S4) video inversion (every line) | X | | |
| (S5) video inversion (random lines) | | X | |

Table 1 indicates that a scrambling mode detector which is to be compatible with the scrambling formats of the manufactures M1, M2 and M3 must be able to detect the scrambling modes S1, S3, S4 and S5. The scrambling mode detector need not be able to detect the scrambling mode S2 if decoder compatibility with that mode is not required.

The operation of the scrambling mode data inserter 350 of FIG. 3 is now discussed. Still referring to FIG. 4, once the scrambling mode is determined by the control 430, scrambling mode data is output to the scrambling mode data inserter 350. The scrambling mode data may be pre-stored in the memory 440 when it is known that a limited number of modes may be used. For example, a look-up table may correlate the detected scrambling mode with corresponding scrambling mode data, such as a bit string. To illustrate, the scrambling mode of "sync suppress by 6 dB" may correlate with a bit string of "1001", while the scrambling mode of "invert active video with an inversion level of 50 IRE" may correlate with a bit string of "1010", and so forth.

The scrambling mode data may be provided in the vertical blanking interval (VBI) or on an audio subcarrier of the television signal using known techniques. Various standards exist for inserting data into the VBI of a television signal. One possible standard is the Electronic Industries Association (EIA) Standard "Recommended Practice for Line 21 Data Service," ANSI/EIA-608-1994, September 1994, Arlington, Va.; and "SP-3688-1 Changes to EIA-608," Apr. 19, 1996. The EIA standard defines Extended Data Service packets which carry digital data for closed captioning and other data, such as a Vertical Interval Test Signal (VITS), auxiliary real time video, and Automated Measurement of Line-up (AMOL) data. Other standards may be used.

It will be appreciated that the scrambling mode data may assume virtually any form, and digital and/or analog techniques may be used. Moreover, the scrambling mode data need not be carried with the scrambled television signal itself but may be provided in a separate out-of-band signal or even via a different communication path.

The second scrambling mode data provided by the control 430 should be provided in a location that does not interfere with the first scrambling mode data provided by the encoder 310. To this end, a priori knowledge of the first vendor's encoding scheme is useful. The second scrambling mode data can be provided either before or after the first scrambling mode data in the VBI or other location.

The second scrambling mode data should be provided in each field or frame.

Figure 5:
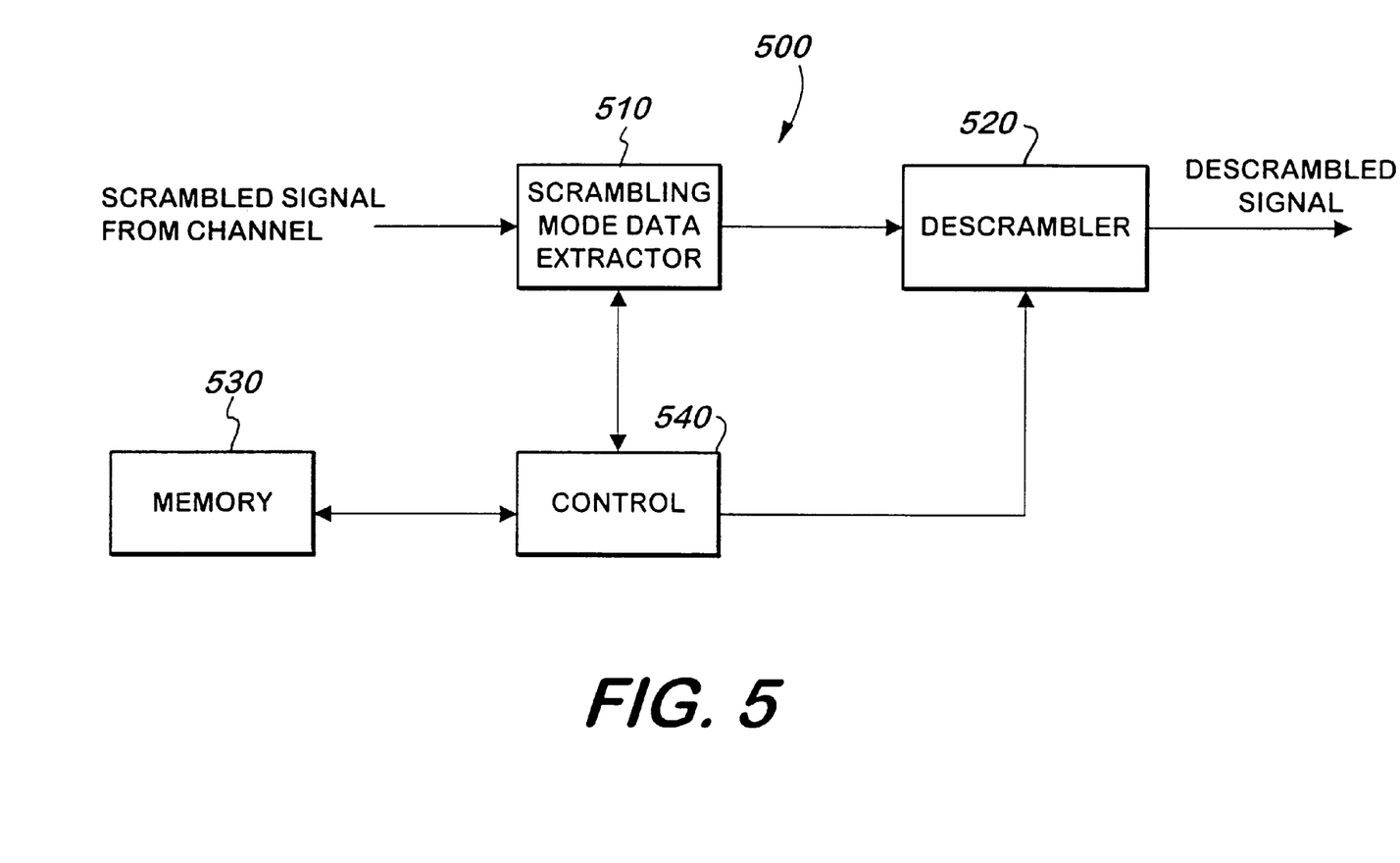
FIG. 5 illustrates a decoder in accordance with the present invention.

FIG. 5 illustrates a decoder in accordance with the present invention. The decoder 500 is compatible with the scrambling mode detection circuit 300 of FIG. 3. The decoder 500 includes a scrambling mode data extractor 510, a descrambler 520, a memory 530 and a control 540. The scrambled signal with the first and second scrambling mode data is received from a channel, such as a cable television network. The first scrambling mode data is assumed to be incompatible with the particular decoder 500. The second scrambling mode data is recovered by the scrambling mode data extractor 510 and provided to the control 540.

The scrambling mode data extractor 510 may use conventional techniques to recover the second scrambling mode data from the VBI or audio subcarrier of the scrambled signal, for example. Alternatively, the second scrambling mode data may be recovered from an out-of-band signal or via some other communication path.

The scrambling mode data may comprises a bit string, for example. The control may access the memory 530 to compare the bit string to a look up table entry which indicates the corresponding descrambling action which must occur to descramble the signal. For example, if the recovered bit string indicates that sync suppression was used, the control 540 will command the descrambler 520 to restore the synchronization pulses. This may be achieved using known techniques. For example, timing pulses may be provided on the audio subcarrier which indicate where the synchronization pulses should be inserted.

Alternatively, the recovered scrambling mode data may indicate that particular video lines have an inverted active video portion. The data may also indicate the inversion reference level. In this case, the descrambler will invert the already-inverted video portion to recover the original, non-inverted video portion. The descrambled signal is thereby output from the descrambler 520 and provided to an output device, such as a television.

There may or may not be other decoders in the system or network which are compatible with the first scrambling mode data. Moreover, it is possible to have three or more formats of scrambling mode data as mentioned previously to maintain descrambling compatibility with three or more corresponding groups of decoder populations.

Accordingly, it can be seen that the present invention provides a method and apparatus for determining the scrambling mode of a data signal such as a television signal in a cable television network, and providing corresponding scrambling mode data in a specific decoder-compatible format. For existing systems which employ analog scrambling with first scrambling-specific data for a first decoder population, a second data stream of scrambling mode data is inserted into the scrambled signal to provide compatibility with a corresponding second decoder population. There is no need to recover and decode the original scrambling mode data to determine the descrambling mode to be applied by the decoders in the second decoder population.

The system is compatible with dynamic scrambling mode changes. The television signal is stored and delayed by an amount of time which is necessary to accurately determine the scrambling mode so that the second scrambling mode data stream can be updated, thereby allowing the corresponding decoder population to descramble the scrambled signal. The delay may be a fraction of a second, for example, using available circuitry. The scrambled signal is digitized, stored in memory, and reconstructed after the necessary time period has elapsed.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for processing a scrambled analog television signal that has scrambling mode data in a first format that is incompatible with a decoder, said scrambling mode data indicating a scrambling mode of the scrambled analog television signal, comprising the steps of:

delaying the scrambled analog television signal for a delay period;

processing the scrambled analog television signal to detect the scrambling mode thereof during the delay period;

providing scrambling mode data in a second format, which is different from the first format, in response to the detected scrambling mode;

said second format being compatible with the decoder;

associating the scrambling mode data in the second format with the scrambled analog television signal after the delay period; and communicating the scrambling mode data in the second format and the scrambled analog television signal, after the delay period, to the decoder.

2. The method of claim 1, wherein said associating step comprises the step of:

inserting the scrambling mode data in the second format into the scrambled analog television signal after the delay period.

3. The method of claim 1, wherein the scrambling mode data in the first format remains with the scrambled analog television signal during the delay period and is communicated therewith to a compatible decoder.

4. A method for providing scrambling mode data for a scrambled analog television signal, comprising the steps of:

delaying the scrambled analog television signal for a delay period;

processing the scrambled analog television signal to detect a scrambling mode thereof during the delay period;

providing scrambling mode data in at least first and second different formats, wherein said scrambling mode data is indicative of the detected scrambling mode;

associating the scrambling mode data with the scrambled analog television signal after the delay period; and communicating the scrambling mode data and the scrambled analog television signal after the delay period to a decoder population having at least a first decoder that is compatible with the first scrambling mode data format to allow recovery of the scrambling mode data thereat, and a second decoder that is compatible with the second scrambling mode data format to allow recovery of the scrambling mode data thereat.

5. The method of claim 4, wherein said associating step comprises the step of:

inserting the scrambling mode data into the scrambled analog television signal after the delay period.

6. A method for providing scrambling mode data for a scrambled analog television signal, comprising the steps of:

digitizing the scrambled analog television signal to provide digitized data;

storing the digitized data during a delay period;

processing the scrambled analog television signal to detect a scrambling mode thereof during the delay period;

providing scrambling mode data which is indicative of the detected scrambling mode;

recovering the scrambled analog television signal from the digitized data; and associating the scrambling mode data with the recovered scrambled analog television signal.

7. The method of claim 6, wherein said associating step comprises the step of:

inserting the scrambling mode data into the recovered scrambled analog television signal.

8. A method for providing scrambling mode data for a scrambled analog television signal, comprising the steps of:

delaying the scrambled analog television signal for a delay period;

processing the scrambled analog television signal to detect a scrambling mode thereof during the delay period by sampling at least a first value of the scrambled analog television signal, and comparing said first value to a pre-stored value;

providing scrambling mode data which is indicative of the detected scrambling mode; and associating the scrambling mode data with the scrambled analog television signal after the delay period.

9. The method of claim 8, wherein said associating step comprises the step of:

inserting the scrambling mode data into the scrambled analog television signal.

10. The method of claim 9, wherein:
said first value is sampled from a sync-suppressed region of said scrambled analog television signal.

11. A method for providing scrambling mode data for a scrambled analog television signal, comprising the steps of:
delaying the scrambled analog television signal for a delay period;
processing the scrambled analog television signal to detect a scrambling mode thereof during the delay period by:
(a) sampling at least a first value of the scrambled analog television signal;
(b) sampling at least a first value of a clear analog television signal from which the scrambled analog television signal was derived; and
(c) comparing said first values to each other;
providing scrambling mode data which is indicative of the detected scrambling mode; and
associating the scrambling mode data with the scrambled analog television signal after the delay period.

12. The method of claim 11, wherein said associating step comprises the step of:
inserting the scrambling mode data into the scrambled analog television signal.

13. The method of claim 11, wherein:
the first value of the scrambled analog television signal is sampled from a sync-suppressed region thereof; and
the first value of the clear analog television signal is sampled from a synchronization pulse region thereof which corresponds to said sync-suppressed region.

14. The method of claim 11, wherein:
the first value of the scrambled analog television signal is sampled from an inverted active video region thereof; and
the first value of the clear analog television signal is sampled from an active video region thereof which corresponds to said inverted active video region.

15. A method for providing scrambling mode data for a scrambled analog television signal, comprising the steps of:
delaying the scrambled analog television signal for a delay period;
processing the scrambled analog television signal to detect a scrambling mode thereof during the delay period on one of: (a) a frame-by-frame basis, and (b) a field-by-field basis;
providing scrambling mode data which is indicative of the detected scrambling mode; and
associating the scrambling mode data with the scrambled analog television signal after the delay period.

16. The method of claim 15, wherein said associating step comprises the step of:
inserting the scrambling mode data into the scrambled analog television signal after the delay period.

17. A method for providing scrambling mode data for a scrambled analog television signal, comprising the steps of:
delaying the scrambled analog television signal for a delay period;
processing the scrambled analog television signal to detect a scrambling mode thereof during the delay period by descrambling the scrambled analog television signal to obtain a clear analog television signal;
providing scrambling mode data which is indicative of the detected scrambling mode; and
associating the scrambling mode data with the scrambled analog television signal after the delay period.

18. The method of claim 17, wherein said associating step comprises the step of:
inserting the scrambling mode data into the scrambled analog television signal after the delay period.

19. The method of claim 17, wherein:
said scrambling mode is detected using timing information obtained from said clear analog television signal.

20. The method of claim 17, wherein said processing step comprises the further steps of:
sampling at least a first value of the scrambled analog television signal;
sampling at least a first value of the clear analog television signal; and
comparing said first values to each other.

21. The method of claim 17, wherein:
said scrambling mode is detected using timing information obtained from a clear analog television signal from which the scrambled analog television signal is derived.

22. An apparatus for providing scrambling mode data for a scrambled analog television signal, comprising:
means for digitizing the scrambled analog television signal to provide digitized data;
a memory for storing the digitized data during a delay period;
means for processing the scrambled analog television signal to detect a scrambling mode thereof during the delay period;
means for providing scrambling mode data which is indicative of the detected scrambling mode;
means for recovering the scrambled analog television signal from the digitized data; and
means for associating the scrambling mode data with the recovered scrambled analog television signal.

23. The apparatus of claim 22, wherein said associating means is adapted to insert the scrambling mode data into the recovered scrambled analog television signal.

24. An apparatus for providing scrambling mode data for a scrambled analog television signal, comprising:
means for delaying the scrambled analog television signal for a delay period;
means for processing the scrambled analog television signal to detect a scrambling mode thereof during the delay period by sampling at least a first value of the scrambled analog television signal, and comparing said first value to a pre-stored value;
means for providing scrambling mode data which is indicative of the detected scrambling mode; and
means for associating the scrambling mode data with the scrambled analog television signal after the delay period.

25. The apparatus of claim 26, wherein said associating means is adapted to insert the scrambling mode data into the scrambled analog television signal.

26. The apparatus of claim 24, wherein:
said processing means samples said first value from a sync-suppressed region of said scrambled analog television signal.

27. An apparatus for providing scrambling mode data for a scrambled analog television signal, comprising:
means for delaying the scrambled analog television signal for a delay period;

means for processing the scrambled analog television signal to detect a scrambling mode thereof during the delay period by:
  (a) sampling at least a first value of the scrambled analog television signal;
  (b) sampling at least a first value of a clear analog television signal from which the scrambled analog television signal was derived; and
  (c) comparing said first values to each other;
means for providing scrambling mode data which is indicative of the detected scrambling mode; and
means for associating the scrambling mode data with the scrambled analog television signal after the delay period.

28. The apparatus of claim 27, wherein said associating means is adapted to insert the scrambling mode data into the scrambled analog television signal.

29. The apparatus of claim 27, wherein:
said processing means samples the first value of the scrambled analog television signal from a sync-suppressed region thereof, and samples the first value of the clear analog television signal from a synchronization pulse region thereof which corresponds to said sync-suppressed region.

30. The apparatus of claim 27, wherein:
said processing means samples the first value of the scrambled analog television signal from an inverted active video region thereof, and samples the first value of the clear analog television signal from an active video region thereof which corresponds to said inverted active video region.

31. An apparatus for providing scrambling mode data for a scrambled analog television signal, comprising:
means for delaying the scrambled analog television signal for a delay period;
means for processing the scrambled analog television signal to detect a scrambling mode thereof during the delay period on one of: (a) a frame-by-frame basis, and (b) a field-by-field basis;
means for providing scrambling mode data which is indicative of the detected scrambling mode; and
means for associating the scrambling mode data with the scrambled analog television signal after the delay period.

32. The apparatus of claim 31, wherein said associating means is adapted to insert the scrambling mode data into the scrambled analog television signal after the delay period.

33. An apparatus for providing scrambling mode data for a scrambled analog television signal, comprising:
means for delaying the scrambled analog television signal for a delay period;
means for processing the scrambled analog television signal to detect a scrambling mode thereof during the delay period by descrambling the scrambled analog television signal to obtain a clear analog television signal;
means for providing scrambling mode data which is indicative of the detected scrambling mode; and
means for associating the scrambling mode data with the scrambled analog television signal after the delay period.

34. The apparatus of claim 33, wherein said associating means is adapted to insert the scrambling mode data into the scrambled analog television signal after the delay period.

35. The apparatus of claim 33, wherein:
said processing means is adapted to detect said scrambling mode using timing information obtained from said clear analog television signal.

36. The apparatus of claim 33, wherein said processing means is adapted to:
sample at least a first value of the scrambled analog television signal;
sample at least a first value of the clear analog television signal; and
compare said first values to each other.

37. The apparatus of claim 33, wherein:
said processing means is adapted to detect said scrambling mode using timing information obtained from a clear analog television signal from which the scrambled analog television signal is derived.

* * * * *